(12) United States Patent
Rumbaugh et al.

(10) Patent No.: US 8,664,817 B2
(45) Date of Patent: Mar. 4, 2014

(54) ELECTRICAL SUBMERSIBLE PUMP SYSTEM HAVING HIGH TEMPERATURE INSULATION MATERIALS AND BUFFERED LUBRICANT

(75) Inventors: Michael R. Rumbaugh, Claremore, OK (US); Jim F. Evenson, Claremore, OK (US); Jackson E. Reynolds, Claremore, OK (US); David G. Korte, Siloam Springs, AR (US)

(73) Assignee: Baker Hughes Incorporated, Houston, TX (US)

(*) Notice: Subject to any disclaimer, the term of this patent is extended or adjusted under 35 U.S.C. 154(b) by 515 days.

(21) Appl. No.: 13/108,528

(22) Filed: May 16, 2011

(65) Prior Publication Data

US 2012/0063932 A1    Mar. 15, 2012

Related U.S. Application Data

(60) Provisional application No. 61/382,355, filed on Sep. 13, 2010.

(51) Int. Cl.
*H02K 3/30* (2006.01)
*F04D 13/08* (2006.01)
*H02K 1/12* (2006.01)
*H02K 3/34* (2006.01)
*H02K 3/38* (2006.01)
*H02K 5/132* (2006.01)

(52) U.S. Cl.
CPC *F04D 13/08* (2013.01); *H02K 1/12* (2013.01); *H02K 3/30* (2013.01); *H02K 3/34* (2013.01); *H02K 3/38* (2013.01); *H02K 5/132* (2013.01)
USPC ............................................. 310/87; 310/45

(58) Field of Classification Search
None
See application file for complete search history.

(56) References Cited

U.S. PATENT DOCUMENTS

| 4,582,749 | A | * | 4/1986 | Boulter et al. ............. 442/292 |
| 4,600,805 | A | * | 7/1986 | Glynn et al. ............. 174/102 R |
| 5,089,200 | A | | 2/1992 | Chapman et al. |
| 5,426,264 | A | | 6/1995 | Livingston et al. |
| 5,477,011 | A | | 12/1995 | Singles et al. |
| 5,626,907 | A | | 5/1997 | Hagiwara et al. |
| 5,770,779 | A | | 6/1998 | Nappa et al. |
| 5,782,301 | A | | 7/1998 | Neuroth et al. |
| 5,859,171 | A | | 1/1999 | Sawasaki et al. |
| 5,874,171 | A | | 2/1999 | Wagner |
| 6,191,208 | B1 | | 2/2001 | Takahashi |
| 6,221,970 | B1 | | 4/2001 | Morken et al. |

(Continued)

OTHER PUBLICATIONS

U.S. Appl. No. 12/907,519, filed Oct. 19, 2010.

(Continued)

*Primary Examiner* — Tran Nguyen
(74) *Attorney, Agent, or Firm* — Bracewell & Giuliani LLP (57) ABSTRACT

Electric submersible well pumping systems operable in well temperatures of above about 180° C. (356° F.) utilize high temperature electrical insulation. The electrical insulation includes E-base polyimide films or perfluoropolymer TE films on various components. The insulation films are employed around magnet wires that are threaded through slots in the stator. Slot insulation of E-base polyimide or perfluoropolymer TE film surrounds the magnet wires in the stator slots. Sheets of E-base polyimide or perfluoropolymer TE film extend around and between phase loops of the magnet wire at the lower end of the stator. The motor contains a PAO oil having additives to dissipate acid generated by epoxy used in the motor.

20 Claims, 6 Drawing Sheets

(56) References Cited

U.S. PATENT DOCUMENTS

| | | | |
|---|---|---|---|
| 6,281,296 B1 | 8/2001 | MacLachlan et al. | |
| 6,328,316 B1 | 12/2001 | Fukuhara et al. | |
| 6,503,972 B1 | 1/2003 | Rai et al. | |
| 6,548,179 B2 | 4/2003 | Uhara et al. | |
| 6,555,238 B2 | 4/2003 | Uhara et al. | |
| 6,555,752 B2 * | 4/2003 | Dalrymple et al. | 174/102 R |
| 6,585,046 B2 | 7/2003 | Neuroth et al. | |
| 6,638,999 B2 | 10/2003 | Bish et al. | |
| 6,908,685 B2 | 6/2005 | Uhara et al. | |
| 6,969,940 B2 * | 11/2005 | Dalrymple et al. | 310/215 |
| 6,992,143 B2 | 1/2006 | Wang | |
| 7,015,396 B2 * | 3/2006 | Wada et al. | 174/110 N |
| 7,087,843 B2 * | 8/2006 | Ishii et al. | 174/110 R |
| 7,354,974 B2 | 4/2008 | Takahashi et al. | |
| 7,439,200 B2 | 10/2008 | Lee et al. | |
| 7,579,134 B2 | 8/2009 | Dueber et al. | |
| 7,611,339 B2 | 11/2009 | Tetzlaff et al. | |
| 7,714,231 B2 | 5/2010 | Varkey et al. | |
| 7,758,781 B2 | 7/2010 | Schmeckpeper et al. | |
| 7,789,689 B2 | 9/2010 | Frey et al. | |
| 2009/0317264 A1 | 12/2009 | Manke et al. | |
| 2010/0139311 A1 * | 6/2010 | Nagao et al. | 62/468 |

OTHER PUBLICATIONS

DuPont Teflon TE7258 Perfluoropolymer, Resin Extrusion and Molding Resin, 3 pp.

DuPont Kapton KJ Thermoplastic Polyimide Film, Technical Information, 2 pp.

DuPont Circleville Research Laboratory, Circleville, Ohio, "Advances in Adhesiveless Substrate Technology for Electronic Packaging", by Rajan K. Kanakarajan, 3 pp.

DuPont Kapton EKJ Self-Adhering Polyimide Composite Film, Technical Information, 2 pp.

DuPont Circleville Research Laboratory, Circleville, Ohio, "New Adhesiveless Substrates for FPC and MCM-L", by Rajan K. Kanakarajan, EXPO dated Apr. 25, 26, 27, 1994-4 pp.

DuPont Circleville Research Laboratory, Circleville, Ohio, "Ceramic-Polyimide Systems for Electronic Packaging", by Rajan K. Kanakarajan and Garry D. Osborn, 7 pp.

* cited by examiner

ELECTRICAL SUBMERSIBLE PUMP SYSTEM HAVING HIGH TEMPERATURE INSULATION MATERIALS AND BUFFERED LUBRICANT

RELATED APPLICATIONS

This application claims the benefit of provisional application with the U.S. Ser. No. 61/382,355, titled "High Temperature Electric Submersible Pump (ESP) Motor" filed on Sep. 13, 2010, which hereby is incorporated by reference in its entirety.

FIELD OF THE INVENTION

The present disclosure relates to downhole pumping systems submersible in well bore fluids. More specifically, the present disclosure concerns improved pump motors to drive the submersible pumping systems that can be used in bottom hole temperatures of above about 180° C. (356° F.).

BACKGROUND OF THE INVENTION

Submersible pumping systems are often used in hydrocarbon producing wells for pumping fluids from within the well bore to the surface. These fluids are generally liquids and include produced liquid hydrocarbon as well as water. One type of system used in this application employs a electrical submersible pump (ESP). ESP's are typically disposed at the end of a length of production tubing and have an electrically powered motor. Often, electrical power may be supplied to the pump motor via an electrical power cable from the surface that is strapped alongside the tubing.

A motor lead is secured to the lower end of the power cable, the motor lead terminating in a connector that plugs into a receptacle of the motor. This connector is typically known as a pothead connector.

ESP motors have stators with slots. Insulated magnet wire is wound through the slots in a selected pattern. A sheet of an insulation material may be wrapped around each bundle of magnet wires within each of the slots. The magnet wires extend below a lower end of the stator in loops spaced around a longitudinal axis of the motor. An end bell insulation sheet is formed as a cylinder and extends around all of the loops. The loops are arranged in phases spaced longitudinally from the longitudinal axis. Phase-to-phase insulation sheets are rolled into cylindrical shapes and between the different phase groups. The magnet wires may be bonded in the slots with an epoxy. In one technique, magnet wire leads are spliced to upper ends of three of the magnet wires. The magnet wire leads extend from the upper end of the stator to internal contacts in the motor electrical plug-in receptacle.

Typically, the pumping unit is disposed within the well bore just above where perforations are made into a hydrocarbon producing zone. This placement thereby allows the produced fluids to flow past the outer surface of the pumping motor and provide a cooling effect.

In spite of the heat transfer between the fluid and the motor, over a period of time the motor may become overheated. Overheating may a problem when the fluid has a high viscosity, a low specific heat, and a low thermal conductivity. This is typical of highly viscous crude oils. Also, the motor may be forced to operate at an elevated temperature, past its normal operating temperature, in steam injection wells. Elevated well temperatures can reduce motor life.

SUMMARY

In view of the foregoing, electric submersible pumping systems that are capable of operating in bottom hole temperatures of above about 180° C. (356° F.) are provided as embodiments of the present disclosure. The electric submersible pumping system includes an electric motor coupled to a pump. A power lead receptacle is mounted to a housing of the motor. A power cable having a motor lead with a pothead connector on its lower end plugs into the receptacle. The motor has a stator with a plurality of slots, each of the slots having a bundle of magnet wires.

At least some of the conductors in the power cable, motor lead, pothead conductor, receptacle and internally in the motor may be insulated with a high temperature electrical insulation. In one of the embodiments, an e-base polyimide film is adhered to an electrical conductor by a polyimide adhesive. In another embodiment, the E-base polyimide film is adhered to the conductor by a fluoropolymer adhesive. In a third embodiment a perfluoropolymer is extruded over the conductor.

A plurality of internal motor leads lead from an upper end of the stator to the receptacle. The internal motor leads may be insulated as described above. Also, a tube formed of an insulation material may surround each of the motor leads. The tube extends from the stator to the receptacle.

A slot insulation surrounds at least a portion of each of the bundles in the slots. The slot insulation comprises a sheet of E-base polyimide film in one of the embodiments. The sheet of E-base polyimide film may be sandwiched between sheets of other polymers, such as polyether ether ketone (PEEK) and polytetrafluoroethylene (PTFE). The bundle of magnet wires in the slots are preferably embedded within epoxy.

An end bell on a lower end of the stator is surrounded by loops of magnet wire protruding past the lower end of the stator. The loops of magnet wire are grouped into three phases. An end bell insulation comprising a sheet of E-base polyimide extends around the loops of magnet wire at an inner surface of the motor housing. Sheets of phase-to-phase insulation extend around the end bell between each of the phases, the phase-to-phase insulation also comprising sheets of E-base polyimide. The end bell insulation and phase-to-phase insulation may include sheets of other polymers, such as PTFE, that sandwich the E-base polyimide sheets between them.

The motor contains a PAO dielectric lubricant that has additives designed to dissipate amino acid. The acid is created by reactions with the epoxy in the slots of the stator. At least some of the polyimide insulation is exposed to the lubricant. If not buffered, the acid generated would be harmful to the insulation.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE DISCLOSURE

Figure 1:
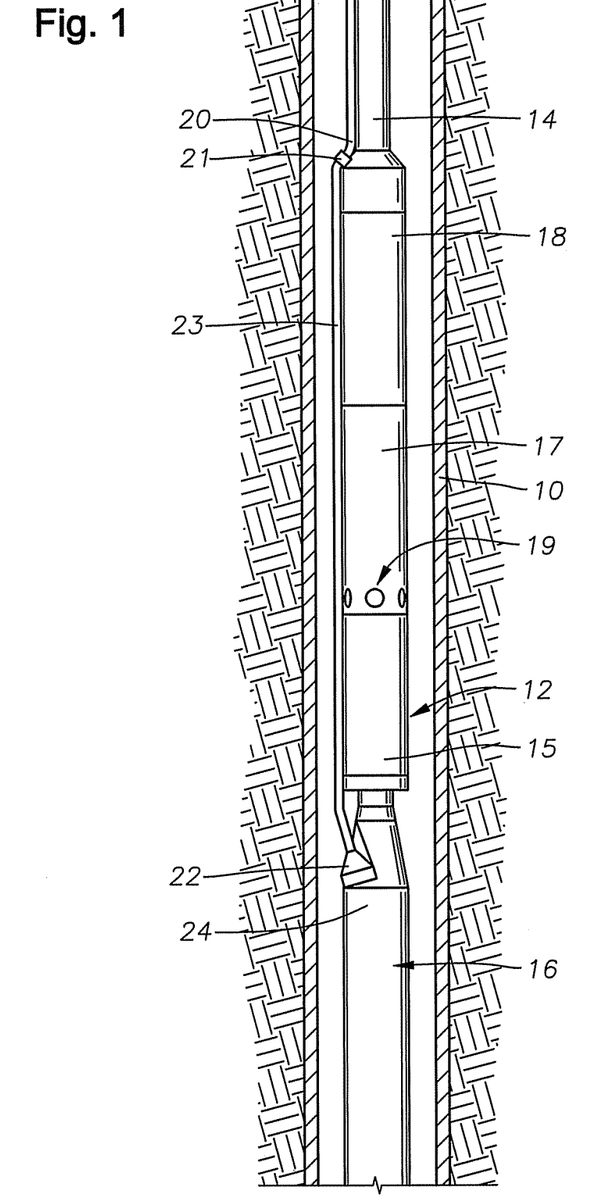
FIG. 1 is a side view of an electrical submersible pump (ESP) system within a well and having features in accordance with this disclosure.

FIG. 1 is an elevational section view of cased well 10 having an electrical submersible pumping system (ESP) 12 disposed therein. ESP 12 includes an electric motor 16, a seal/equalizer section 15, an optional gas separator 17, and a pump 18. Pump 18 may comprise a centrifugal pump, a progressing cavity pump, or some other rotary pump. Fluid inlets 19 are shown provided on separator 17 for providing a passage for receiving fluid into pump 18. Production tubing 14 is coupled to pump 18 discharge for conveying pressurized production fluid from the ESP 12 to surface.

Power cable 20 extends alongside production tubing 14, terminating in a splice or connector 21 that electrically couples cable 20 to a motor lead 23. On its lower end, motor lead 23 connects to a pothead connector 22 that electrically connects and secures motor lead 23 to motor housing 24 of electric motor 16. In another embodiment, cable 20 can extend all the way from the surface to pothead connector 22, thereby eliminating the need for motor lead 23. Also, in another embodiment, ESP could be supported on coiled tubing, rather than production tubing 14. The power cable would be located inside the coiled tubing.

Figure 2A:
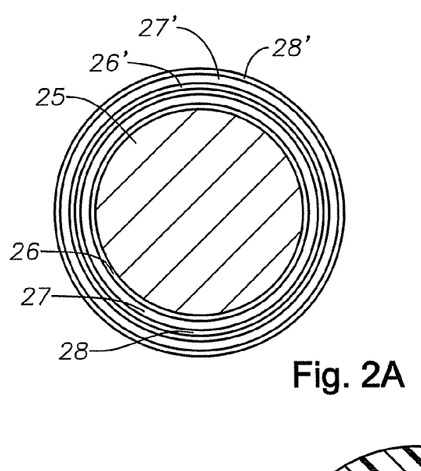
FIGS. 2A, 2B and 2C comprise schematic sectional views of three alternate types of insulation systems for the various wires of the ESP system of FIG. 1.
Figure 2B:
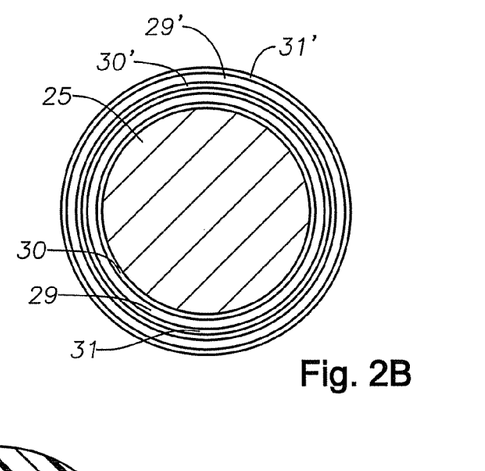
Figure 2C:
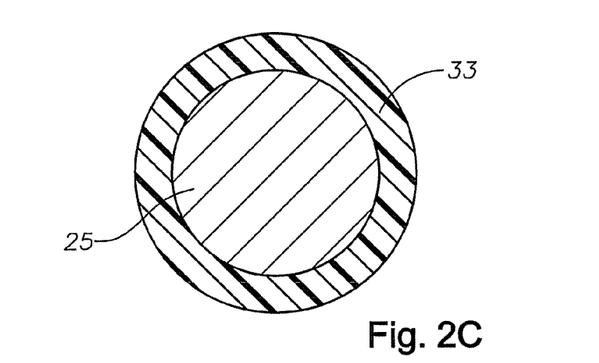

ESP system 11 has many electrical wires, including those in motor lead 23 and internal wires in motor 16. At least some of the wires and other components are insulated for high temperature applications. FIGS. 2A, 2B and 2C schematically show three alternate insulation systems for high temperature applications. The drawings are not to scale and generically illustrate high temperature insulation systems for electrical conductors 25, 25' and 25". In regard to FIG. 2A, a strip of tape or film 27 with three layers is wrapped helical around conductor 25 in one direction. Then a strip of the same film 27, indicated as film 27' is wrapped around the first layer of tape 27 in the same direction. This results in six insulation layers surrounding conductor 25. Film 27 is preferably an E-base polyimide film having an adhesive layer 26 on its inner side and an adhesive layer 28 on its outer side prior to wrapping around conductor 25. Film 27' has the same adhesive layers 26' and 28'. On the second wrapping, the inner adhesive layer 26' of the second film 27' will be in contact with the outer adhesive layer 28 of the first film 27. Outer adhesive layer 28' of second film 27' will be left exposed. After wrapping heat is applied to cause inner adhesive layer 26 to bond to conductor 25 and adhesive layers 28 and 26' to bond to each other. The outer adhesive layer 28' cures upon the application of heat and may provide lubrication when the conductor is inserted into a tight space. Suitable E-base polyimides coated with a high temperature polyimide adhesive are commercially available from DuPont, such as Kapton® EKJ. The adhesive layers 26, 28 on the inner and outer sides of the e-base film 27 of this product may be the same as each other.

Referring to FIG. 2B, an E-base polyimide film 29 that may be the same as polyimide film 27 is employed as the electrical insulation. Film 29 is also wrapped helically around conductor 25 in two different directions, as in FIG. 2A. Film 29 also has an inner adhesive layer 30 and an outer adhesive layer 31. With the first wrap, inner adhesive layer 30 contacts and is subsequently bonded to conductor 25 by the application of heat. When the second wrap of film 29' is made, its inner adhesive layer 30' contacts and subsequently bonds to outer adhesive layer 31 of the first wrap. Outer adhesive layer 31' of the second wrap remains exposed and may assist in lubricating the electrical conductor as it is being pushed into a tight passage.

In the preferred embodiment, inner and outer adhesive layers 30 and 31 differ from each other and also differ from the material forming adhesive layers 26 and 28 in FIG. 2A. Adhesive layers 30 and 31 are high temperature fluoropolymers blended with polytetrafluoroethylene (PTFE). A suitable type of layered E-base polyimide film with fluoropolymer adhesive is available commercially from DuPont as Oasis® composite film.

In FIG. 2C, insulation layer 33 is extruded over electrical conductor 25". Insulation layer 33 is a high temperature perfluoropolymer. A suitable type of perfluoropolymer that may be extruded is commercially available from DuPont as perfluoropolymer TE 6058.

Figure 3:
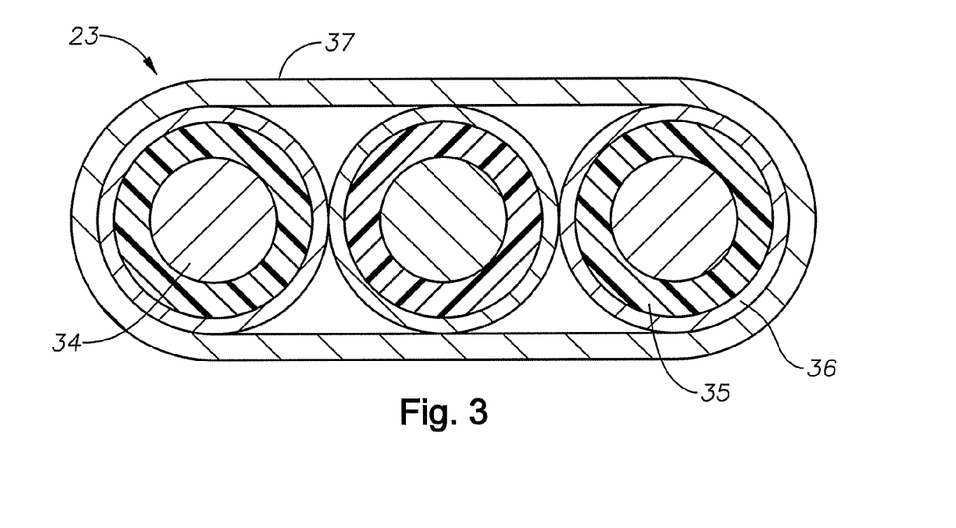
FIG. 3 is a transverse cross-sectional view of a portion of the motor lead of the system of FIG. 1.

Power cable 20 may be conventional or it may have insulation in accordance with a selected one of the systems of FIG. 2A, 2B or 2C. Motor lead 23 preferably employs a selected one of the systems of FIG. 2A, 2B or 2C. Referring to FIG. 3, motor lead 23 has three insulated conductors 34 positioned side-by-side. Each conductor 34 has an insulation 35 that may be wraps of film as described in connection with FIG. 2A or 2B. Alternately, insulation 35 may be a single layer of extruded material as in FIG. 2C. In this embodiment, a metal tube 36 surrounds each insulation 35. Tubes 36 may be formed of an anti-corrosive material, such as Inconel or a stainless steel.

Figure 4:
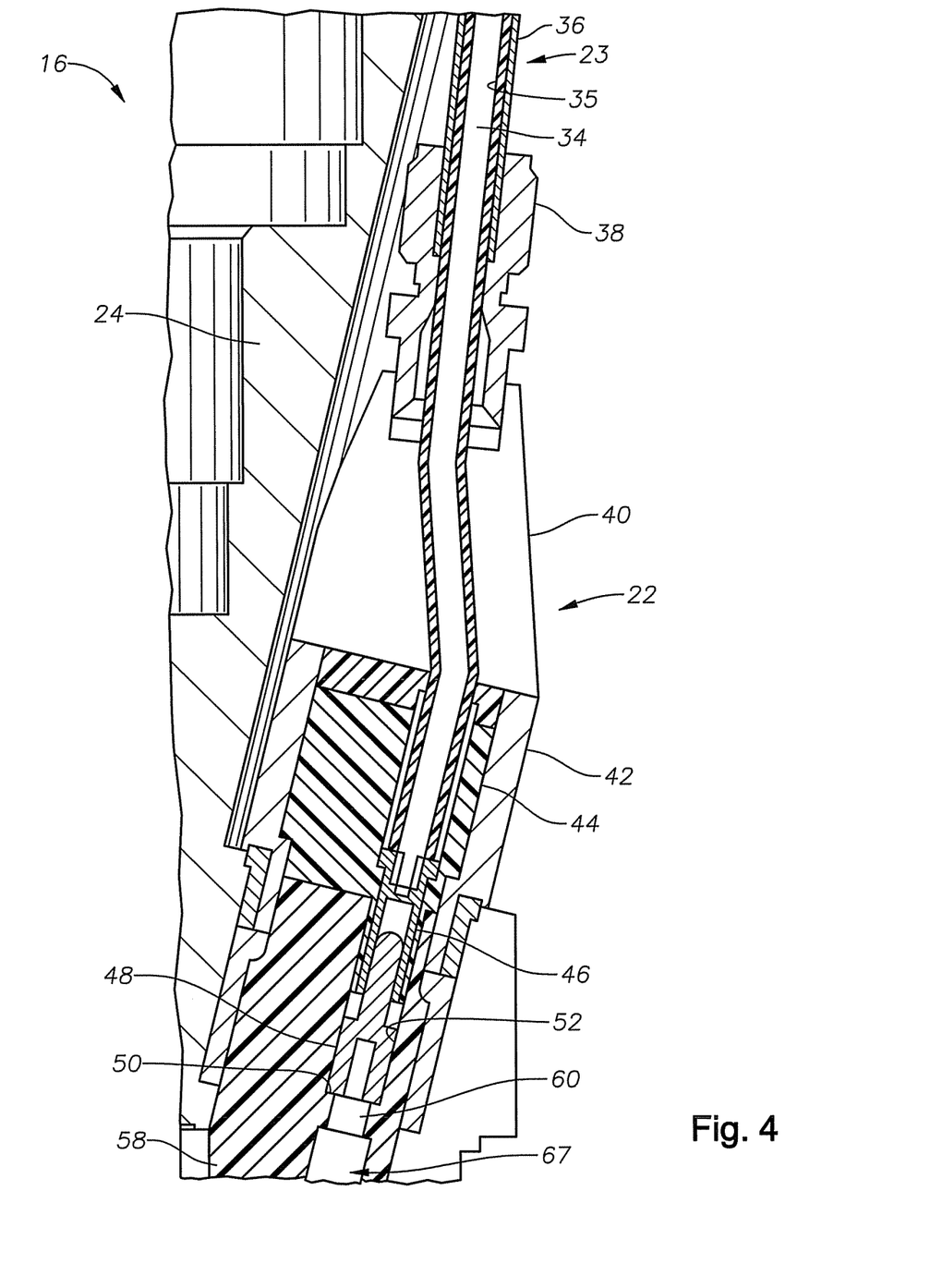
FIG. 4 is an enlarged sectional view of the pothead connector of the motor lead connected to the motor of the ESP system of FIG. 1.

FIG. 4 is a longitudinal cross section view depicting one embodiment of pothead connector 22. Other configurations of pothead connectors may be employed with the electrical insulation of this disclosure. In the embodiment shown, each motor lead tube 36 extends into a tubing adapter 38. Tubing adapter 38 is a conventional compression fitting and is secured to a threaded receptacle in an upper cap 40, which is shown schematically. Tube 36 terminates within tubing adapter 38, where it is secured by the compression exerted by tubing adapter 38. Each insulated motor lead conductor 34 (only one shown) extends past the termination of tube 36 through upper cap 40 and into a lower cap 42. Upper cap 40 may be filled with an epoxy. A pothead electrical insulator 44 is located within lower cap 42. The three motor lead conductors 34, along with their layers of insulation 35, extend through holes in pothead insulator 44. An electrical terminal 46, which is shown as a female type, is secured to each motor lead conductor 34. Insulation 35 extension to female terminal 46. Female terminals 46 may be secured within pothead insulator 44 in a variety of manners.

Female terminals 46 stab into engagement with mating male terminals 46 mounted within an I-block 58 formed of an electrical insulation material. I-block 58 is secured within a receptacle in motor housing 24. This arrangement could be reversed, with female connectors mounted in I-block 58. Male terminals 48 may be secured within I-block 58 as variety of ways. In this example, each male terminal 48 has a lower end that abuts a shoulder 50 within each hole 52 in I-block 58.

Each male terminal 48 is secured to a magnet wire 60 to supply power to the motor. Magnet wire 60 has an electrical conductor 62 surrounded by one or more layers of insulation 63 (FIG. 5), which may be a selected one of the insulation types described in connection with FIG. 2A, 2B or 2C.

Figure 5:
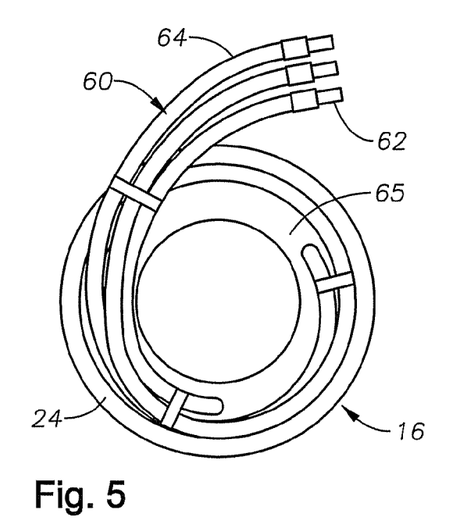
FIG. 5 is a top end view of the motor of the ESP system of FIG. 1, with the upper connector removed to illustrate an internal non-flexible motor lead made in accordance with this disclosure.
Figure 6:
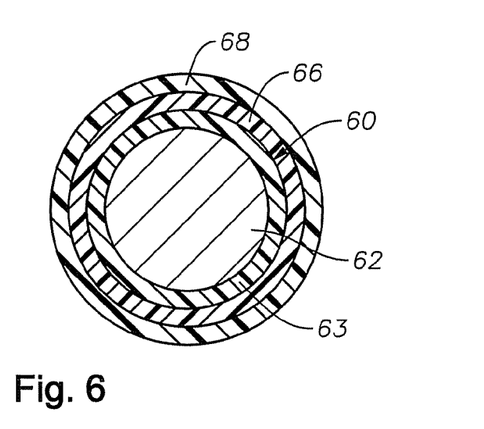
FIG. 6 is a cross-sectional view of one of the internal motor leads of FIG. 4, taken along the line 6-6.

Referring to FIG. 5, magnet wires 60 for each electrical phase extend from a stator 65 stationarily mounted in motor housing 24. Each magnet wire 60 makes up one-third of the windings within stator 65 and extends continuously without any splices directly from the interior of stator 65 to I-block 58. For mechanical protection, preferably, each magnet wire 60 from the upper end of stator 65 to I-block 58 (FIG. 4) is encased in one or more tubes 66 and 67 (FIG. 6). Preferably each tube 66, 67 is formed of a high temperature electrical insulation material. In one example the inner tube 66 comprises polytetrafluoroethylene (PTFE) and the outer tube 67 comprises perfluoroalkoxy (PFA) or other high temperature rigid insulation materials. Tube 66 need not be bonded to insulation 63 surrounding conductor 62 of magnet wire 60. Also, tube 67 does not need to bond to tube 66. Tubes 66, 67 (only the outer tube 67 shown in FIG. 4) around each magnet wire 60 extend into a hole formed in I-block 58, as shown in FIG. 4. The retention of female terminal 48 in I-blocks retains tubes 66, 67 within the mating holes in I-block 58. It is not necessary to seal tubes 66, 67 against the entry of dielectric lubricant contained in motor 16. Thus insulation 63 around each magnet wire 60 may be immersed in the lubricant.

Figure 7:
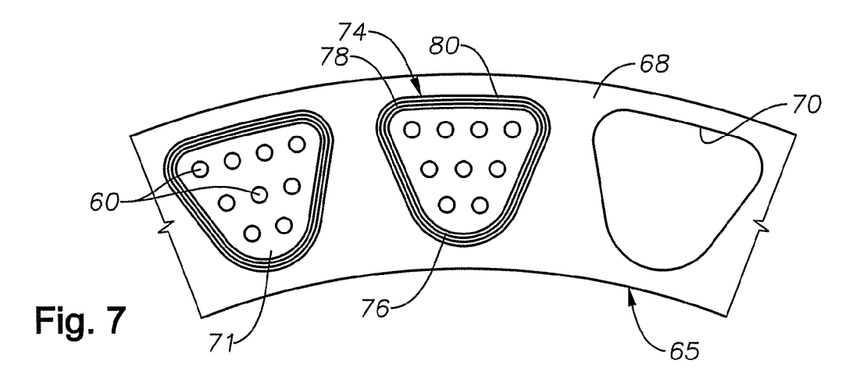
FIG. 7 is a partial cross-sectional view of a portion of the stator, illustrating one of the stator slots and the magnet wires of the motor of FIG. 1.

Referring to FIG. 7, stator 65 comprises a plurality of metal laminations or disks 68 stacked on top of each other. Each disk 68 has holes or slots 70 spaced circumferentially around. Magnet wires 60 are threaded through slots 70 and bonded within the slots with an epoxy 71 or similar material. The number of turns of magnet wires 60 in each slot 70 varies with the motor rating or winding profile. Tubes 66 and 67 (FIG. 6) do not extend into slots 70, rather begin at the upper end of stator 65 and extend to I-block 58 (FIG. 4). The magnet wires 60 employed as lead wires for each phase within tubes 66, 68 extend continuously from within various slots 70 to I-block 58 without splices. Each phase of the winding made by magnet wires 60 may have one or more splices made during the winding process, but these splices will be located in stator 65. There are no splices in the lead portion of magnet wires 60 within tubes 66, 67. The portion of magnet wires 60 located within slots 70 has identical insulation 63 to the portion of magnet wires 60 located in tubes 66, 68 (FIG. 6).

A slot insulation 74 extends around the periphery of each slot 70, wrapping around the bundle of magnet wires 60. Slot insulation 74 is made up of one or more layers of electrical insulation. In this embodiment, slot insulation 74 has an inner layer 76, an intermediate layer 78, and an outer layer 80. During installation, slot insulation 74 is folded into a tube and inserted through slots 70 of stator 65 before inserting magnet wires 60. Preferably slot insulation 74 does not bond to disks 68 or to magnet wires 60 but the layers 76, 78 and 80 could bond to each other. The slot insulation 74 within each slot 70 extends a full length of stator 65.

Figure 8:
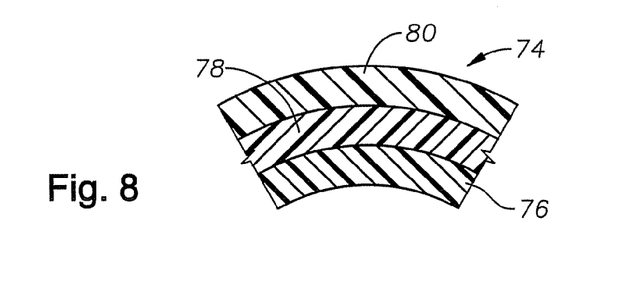
FIG. 8 is an enlarged sectional view of a portion of the slot insulation of FIG. 6.

FIG. 8 illustrates a portion of slot insulation 74 in more detail. Intermediate layer 78 comprises an E-base polyimide film similar to that described in connection with FIGS. 2A and 2B, preferably without an adhesive layer. Alternately, intermediate layer 78 could comprise the perfluoropolymer material described in connection with FIG. 2C. Inner layer 76 may be a polyether ether ketone (PEEK) film. Outer layer 80 may be a polytetrafluoroethylene (PTFE) film. Materials other than PEEK and PTFE may be substituted for inner and outer layers 76, 80.

Figure 9:
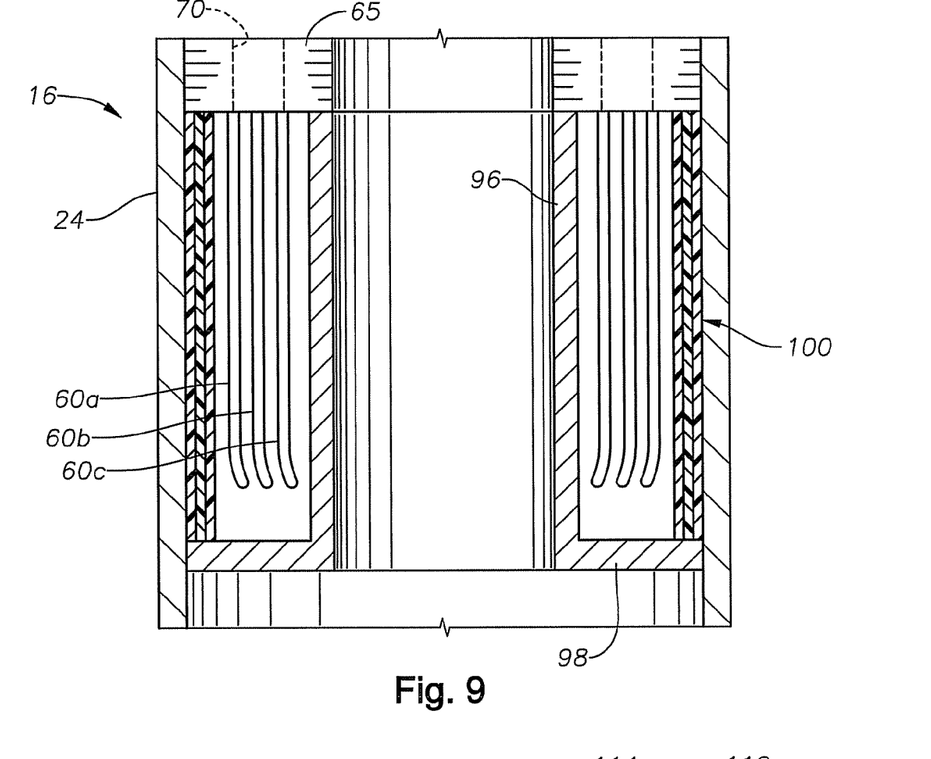
FIG. 9 is a sectional view of a lower end portion of the motor of FIG. 1, with the rotor removed to illustrate end bell insulation, but with the phase-to-phase insulation not shown for clarity.

FIG. 9 schematically illustrates a lower or end bell portion of stator 65. A tubular member 96 joins and extends downward from stator 65. Tubular member 96 may have an external flange 98 on its lower end. Tubular member 96 serves to hold epoxy within the end bell area while it cures. Tubular member 96 and flange 98 are preferably formed of an electrical insulation material. Magnet wires 60 are threaded through stator 65 in a pattern for a three-phase inductive motor. Magnet wires 60 pass downward through certain slots 70 in stator 65, then are turned and pass back upward through other slots 70, forming loops that surround tubular member 96. Magnet wires 60 have their own insulation layers as mentioned above. In addition, an end bell high temperature insulation 100 is formed in a cylindrical shape or sleeve and inserted with its outer diameter in contact with the inner diameter of motor housing 24. End bell insulation 100 is located between the lower end of stator 65 and flange 98. End bell insulation 100 surrounds the various magnet wires 60 located in the annular space surrounding the tubular portion of tubular member 96.

Figure 10:
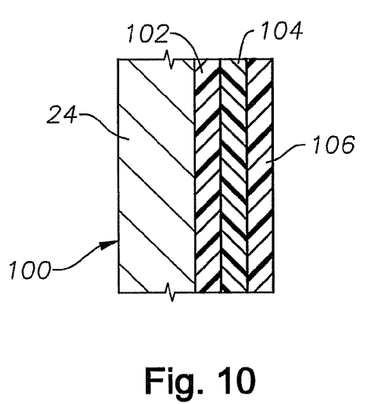
FIG. 10 is an enlarged sectional view of a portion of the end bell insulation of FIG. 8.

FIG. 10 is an enlarged view of a portion of end bell insulation 100. Preferably, end bell insulation 100 comprises three layers 102, 104 and 106. Outer layer 102 and inner layer 106 may comprise PTFE film. Intermediate layer 104 may be a sheet of E-base polyimide film, similar to the films used in FIGS. 2A and 2B. Intermediate layer 104 may also be formed of a perfluoropolymer as discussed in connection with FIG. 2C. Alternately, the various layers 102, 104 and 106 of end bell insulation 100 may be the same as slot insulation 74 (FIG. 8) or vice-versa. End bell insulation 100 does not need to bond to the inner surface of motor housing 24 nor to the magnet wire 60 that it surrounds. However, the various sheets 102, 104 and 106 could be bonded to each other.

Figure 11:
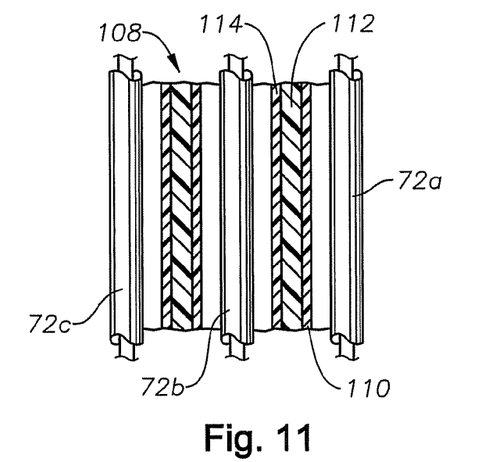
FIG. 11 is an enlarged sectional view of a portion of the insulated magnet wires extending below the stator as in FIG. 8, but with the phase-to-phase insulation shown.

Referring again to FIG. 9, the various loops of magnet wires 60 surround tubular member 96 and are grouped in three separate electrical phases 60a, 60b. and 60c. Relative to a longitudinal axis of motor 16, magnet wires 60a are farther outward than magnet wires 60b, which in turn are farther outward than magnet wires 60c. These phases are preferably insulated from each other by phase-to-phase insulation 108, which is not shown in FIG. 9 for clarity. Referring to FIG. 11, phase-to-phase insulation 108 includes a sleeve formed of an insulation sheet and located between magnet wires 60a and 60b. Another sleeve of phase-to-phase insulation 108 locates between magnet wires 60b and 60c. Each sleeve of phase-to-phase insulation 108 extends around tubular member 96. Phase-to-phase insulation sleeves 108 preferably do not bond to magnet wires 60a, 60b or 60c.

In one embodiment, each phase-to-phase insulation sleeve 108 is of the same material and layers as end bell insulation 100. That is, each insulation sleeve 108 comprises three layers 110, 112 and 114. Inner layer 110 and outer layer 114 comprise sheets of PTFE. Intermediate layer 112 comprises an E-base polyimide sheet or a sheet formed of the perfluoropolymer discussed in connection with FIG. 2C. After installing end bell insulation 100, phase-to-phase insulation 108 and threading the various magnet wires 60, epoxy is disbursed through slots 70 and around tubular member 96. After curing, the portions of the magnet wires 60 below stator 70, end bell insulation 100 and phase-to-phase insulation sleeves 108 will be embedded within the epoxy.

Figure 12:
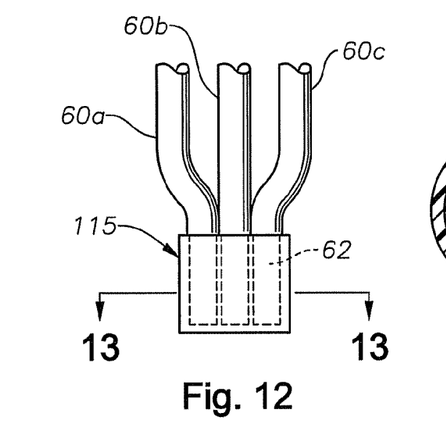
FIG. 12 is a front view illustrating a Y-point connection in the motor of FIG. 1.
Figure 13:
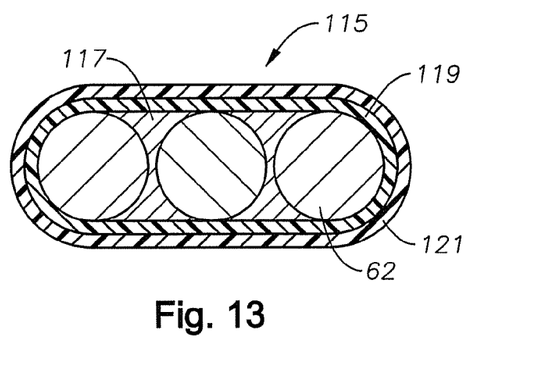
FIG. 13 is a sectional view of the Y-point connection of FIG. 13, taken along the line 14-14 of FIG. 13.

Referring to FIG. 12, the lower ends of magnet wires 60*a*, 60*b* and 60*c* for the three phases are joined to each other at the lower end of the motor below stator 65 (FIG. 9) in a Y-point connection 115. The insulation from each magnet wire 60*a*, 60*b* and 60*c* is stripped back a short distance, exposing conductors 62. Conductors 62 are placed along side each other and joined by brazing material 117. Alternately, conductors 62 could be crimped together with a conductive ring. Insulation 119 is wrapped around the three joined conductors 62, as shown in FIG. 13. Insulation 119 preferably comprises a film with inner and outer adhesive layers of the same type as described in connection with FIG. 2A or FIG. 2B. That is, although shown in FIG. 13 as a single layer, it may comprise three layers wrapped on itself to result in six layers total. Furthermore the exposed ends of conductors 62 are also covered with insulation 119. A shrink wrap tube 121 may be placed around the three joined conductors 62 and heated to tightly enclose insulation 119. Y-point connection may be immersed in motor lubricant. If so, preferably insulation 119 and shrink wrap 121 will prevent motor lubricant from contact with conductors 62.

Figure 14:
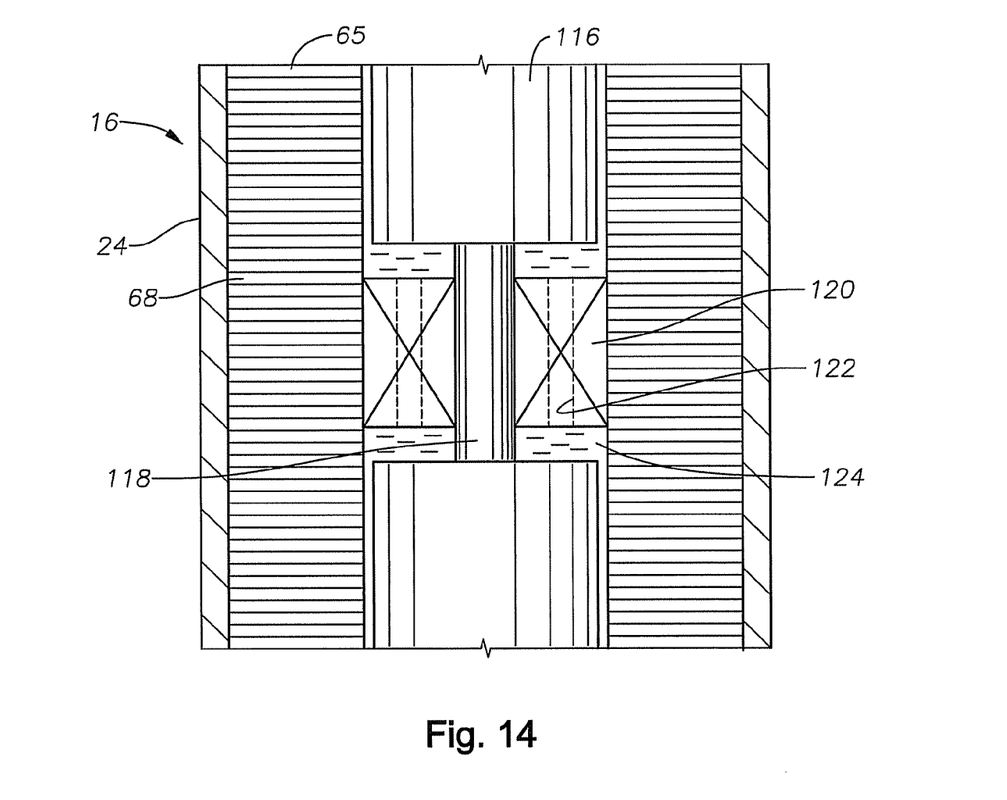
FIG. 14 is a partially sectional view of a portion of the motor of FIG. 1, illustrating spaces between the stator, rotor and radial bearings that contain a lubricant.

Referring to FIG. 14, a schematic sectional view of motor 16 illustrates a rotor 116 mounted on a shaft 118 and positioned in the inner diameter of stator 65. Because motor 16 is often quite long, such as 30 feet or more, rotor 116 is made up of sections (only one shown); each section may be considered to be a separate rotor. A radial bearing 120 mounts between the sections of rotor 116 to radially stabilize shaft 118. Bearing 120 may be of various types and has features on its periphery that frictionally engage the inner diameter of stator 65 to prevent rotation of the outer components of bearing 120. Bearing 120 has lubricant passages 122 to allow a dielectric lubricant or oil 124 to circulate within motor housing 24.

As discussed above, many embodiments of the present invention include the use of very high temperature E-base polyimide film, layered E-base polyimide film layered with a perfluoropolymer adhesive, perfluoropolymer TE, or combinations thereof. These insulation materials can be susceptible to chemical attack during operation at elevated temperatures. An amino acid can be generated at high temperatures by the epoxy 71 that bonds magnet wires 60 within slots 70 of stator 65 (FIG. 8). At least some of the insulation is immersed in motor lubricant. To help alleviate this issue, the ESP motors used in embodiments of the present invention can include an enhanced oil 124, such as a poly alpha olefin (PAO) oil, with additives and buffers. The enhanced oil 124 has better stability, and the additives aid in mitigating the acids and chemical reactions that degrade the insulation materials. The additives or buffer chemicals may have ph levels in the base range to offset higher ph levels created by acids, such as amino acid that may be created in the lubricant during operation. The enhanced motor oil 124 can be used with other types of insulation in addition to the E-base polyimide film, the layered E-base polyimide film layered with a perfluoropolymer adhesive, the perfluoropolymer TE extrusion, or combinations thereof.

A particularly suitable enhanced motor oil that can be used in embodiments of the present invention is commercially available as CL-7VHT oil from Industrial Oils Unlimited. Another suitable commercially available enhanced oil is CL-5VHT oil from Industrial Oils Unlimited. It is also believed that any of the "CL" class of oil having the "VHT" additive from Industrial Oils Unlimited can be used in embodiments of the present invention. In an aspect, any PAO oil having comparable additives as to those used in the "CL" class of oil can be used.

In view of the foregoing, electric submersible pumping systems that are capable of operating in bottom hole temperatures of above about 180° C. (356° F.) are provided as embodiments of the present invention. The elevated temperatures are tolerated by the ESP system by using as insulation either a layered E-base polyimide film layered with a polyimide adhesive, a layered E-base polyimide film layered with a perfluoropolymer adhesive, a perfluoropolymer TE extrusion, or combinations thereof.

The invention claimed is:

1. An electric submersible pumping system comprising:
    a pump;
    an electric motor coupled to the pump, the electric motor having a stator containing a plurality of slots;
    magnet wires threaded within various ones of the slots for each phase of the motor, each of the magnet wires having at least one insulation layer formed of a polyimide;
    an epoxy surrounding and bonding the magnet wires within the slots;
    a dielectric poly alpha olefin (PAO) lubricant contained in the motor; and
    a buffer in the lubricant for dissipating amino acid generated by the epoxy within the motor.

2. The system of claim 1, further comprising:
    a slot insulation surrounding all of the magnet wires within each of the slots; and wherein the slot insulation comprises:
    a sheet of polyimide film.

3. The system of claim 2, wherein the sheet of polyimide film is sandwiched between inner and outer sheets of polymeric films that differ from the polyimide film.

4. The system of claim 3, wherein the slot insulation further comprises:
    an inner sheet of polyether ether ketone (PEEK) film; and
    an outer sheet of polytetrafluoroethylene (PTFE) film, with the polyimide film being sandwiched between.

5. The system of claim 1, wherein:
    the magnet wires protrude past the lower end of the stator in loops positioned around an end bell area; and
    an end bell insulation surrounds all of the loops and comprises a sheet of polyimide film formed in the shape of a sleeve.

6. The system of claim 5, wherein the sheet of polyimide film is sandwiched between inner and outer sheets of polymeric films that differ from the polyimide film.

7. The system of claim 6, wherein each of the inner and outer sheets comprises polytetrafluoroethylene (PTFE) film.

8. The system of claim 5, wherein:
    the loops of magnet wire are grouped into three phases, each of the phases being positioned at a different distance from a longitudinal axis of the motor; and wherein the system further comprises:
    a phase-to-phase insulation sheet formed as a cylinder and located between each of the phases of magnet wire loops; and
    each of the phase-to-phase insulation sheets comprises a polyimide film.

9. The system of claim 8, wherein:
    each of the sheets of polyimide film is sandwiched between inner and outer sheets of polymeric films that differ from the polyimide film.

10. The system of claim 9, wherein each of the inner and outer sheets comprise polytetrafluoroethylene (PTFE) film.

11. The system of claim 1, further comprising:
a motor housing receptacle to which the connector of the power cable assembly releasably attaches, the receptacle having a plurality of internal electrical contacts; wherein
each of the magnet wires within the slots of the stator has an upper portion extending above the stator with an upper end configured as an electrical terminal that releasably attaches to one of the internal electrical contacts, each of the magnet wires within the slots of the stator being a continuous wire without splices from a lower end below the stator to the electrical terminal; and wherein the system further comprises:
at least one tube formed of an insulation material surrounding but not bonded to the insulation layer on each of the motor leads, the at least one tube having a lower end at an upper end of the stator and an upper end at the receptacle.

12. The system of claim 1, wherein:
the magnet wires are joined to each other below the stator, defining a Y-point connection; and
an insulation tape is wrapped around the Y-point connection, the insulation tape comprising a polyimide film.

13. The system according to claim 1, wherein at least some of the insulation on the magnet wires is immersed in the lubricant.

14. An electric submersible pumping system comprising:
a pump;
an electric motor coupled to the pump, the electric motor having a stator containing a plurality of slots;
a poly alpha olefin (PAO) lubricant contained in the motor;
a seal and equalizer section located between the pump and the motor for reducing a pressure differential between the lubricant in the motor and wellbore fluids on an exterior of the motor;
magnet wires threaded within various ones of the slots for each phase of the motor, each of the magnet wires having at least one insulation layer formed of a polyimide;
an epoxy surrounding and bonding the magnet wires within the slots;
a slot insulation comprising a sheet of polyimide film surrounding all of the magnet wires within each of the slots; and
a buffer contained in the lubricant for dissipating amino acid generated by the epoxy to avoid damage to the insulation layer on the magnet wires and the slot insulation.

15. The system of claim 14, wherein:
the magnet wires protrude past a lower end of the stator in loops positioned around an end bell area; and
an end bell insulation surrounds all of the loops and comprises a sheet of polyimide film formed in the shape of a sleeve.

16. The system of claim 15, wherein:
the loops of magnet wire are grouped into three phases, each of the phases being positioned at a different distance from a longitudinal axis of the motor; and wherein the system further comprises:
a phase-to-phase insulation sheet formed as a cylinder and located between each of the phases of magnet wire loops; and
each of the phase-to-phase insulation sheets comprises a polyimide film.

17. An electric submersible pumping system comprising:
a pump;
an electric motor coupled to the pump;
a power lead receptacle mounted to a housing of the motor;
the motor having a stator having a plurality of slots, each of the slots having a bundle of magnet wires;
a polyimide film adhered to a conductor of each of the magnet wires by adhesive;
each of the magnet wires extending above the stator and having an electrical terminal on an upper end that releasably connects to the receptacle, each of the magnet wires extending through selected ones of the slots to the electrical terminal without any splices;
a plurality of tubes formed of an insulation material and having a lower end at an upper end of the stator and an upper end at the receptacle, each of the tubes surrounding one of the magnet wires;
a slot insulation surrounding at least a portion of each of the bundles in the slots, the slot insulation comprising a sheet of polyimide film;
an end bell area on a lower end of the stator where the magnet wires protrude past the lower end of the stator in loops, the loops of magnet wire being grouped into phases;
an end bell insulation sleeve comprising a sheet of polyimide extending around the loops of magnet wire; and
inner and outer phase-to-phase insulation sleeves extending between each of the phases, each of the cylinders comprising a sheet of a polyimide;
a poly alpha olefin (PAO) lubricant contained in the motor; and
an acid dissipating buffering additive contained in the lubricant.

18. The system of claim 17, wherein the lubricant is free to flow into each of the tubes into contact with the polyimide film of each of the magnet wires located in the tubes.

19. The system of claim 17, wherein:
the polyimide film surrounding the conductor of each of the magnet wires comprises a tape with inner and outer adhesive layers, the tape having a first wrap wrapped helically around the conductor in a first direction, and a second wrap wrapped helically around the first wrap in a second direction;
the outer adhesive layer of the first wrap is bonded to the inner adhesive layer of the second wrap; and
the outer adhesive layer of the second wrap is free of bonding engagement with the tube in which it is contained.

20. The system of claim 17, wherein:
the magnet wires are joined to each other below the stator, defining a Y-point connection; and
an insulation tape is wrapped around the Y-point connection, the insulation tape comprising a polyimide film and being immersed in the lubricant.

* * * * *

UNITED STATES PATENT AND TRADEMARK OFFICE
CERTIFICATE OF CORRECTION

PATENT NO. : 8,664,817 B2  Page 1 of 1
APPLICATION NO. : 13/108528
DATED : March 4, 2014
INVENTOR(S) : Michael R. Rumbaugh et al.

It is certified that error appears in the above-identified patent and that said Letters Patent is hereby corrected as shown below:

In the Specification

Column 1, line 26, delete "a" and insert --an-- before "electrical"
Column 1, line 57, after "may" insert --be-- before "a problem"
Column 5, line 3, delete "extension" and insert --extends--
Column 5, line 37, insert --the-- before "I-blocks"
Column 5, line 51, delete "66, 68" and insert --66, 67--

Signed and Sealed this
Twenty-sixth Day of August, 2014

Michelle K. Lee
*Deputy Director of the United States Patent and Trademark Office*